United States Patent
Frantz

[19]

[11] Patent Number: 5,876,241
[45] Date of Patent: Mar. 2, 1999

[54] HORIZONTAL BATTERY CONNECTOR

[75] Inventor: Robert Houston Frantz, Newville, Pa.

[73] Assignee: The Whitaker Corporation, Wilmington, Del.

[21] Appl. No.: 834,187

[22] Filed: Apr. 15, 1997

[51] Int. Cl.[6] .................................................. H01R 3/00
[52] U.S. Cl. ........................................ 439/500; 429/100
[58] Field of Search ................................... 439/500, 627, 439/630, 876; 429/96, 98, 100, 163, 178, 179

[56] References Cited

U.S. PATENT DOCUMENTS

| | | | |
|---|---|---|---|
| 2,731,586 | 1/1956 | Born ........................................... | 317/99 |
| 3,629,793 | 12/1971 | Ettischer et al. ......................... | 439/500 |
| 3,813,637 | 5/1974 | Grebik et al. . | |
| 4,487,820 | 12/1984 | Engelstein et al. ....................... | 429/100 |
| 4,623,203 | 11/1986 | Ritter . | |
| 4,718,742 | 1/1988 | Utoh et al. ................................ | 439/627 |
| 4,842,966 | 6/1989 | Omori et al. ............................... | 429/96 |
| 5,024,605 | 6/1991 | Kasatani et al. .......................... | 439/500 |
| 5,057,385 | 10/1991 | Hope et al. ............................... | 429/163 |
| 5,211,579 | 5/1993 | Seong et al. .............................. | 439/500 |
| 5,240,792 | 8/1993 | Kawabata et al. ........................ | 429/197 |
| 5,582,933 | 12/1996 | Daio et al. ................................ | 429/178 |
| 5,586,907 | 12/1996 | Frantz et al. .............................. | 439/500 |
| 5,805,423 | 9/1998 | Wever et al. .............................. | 439/500 |

OTHER PUBLICATIONS

Data Sheets—Renata Battery Holders; 2 pages.

*Primary Examiner*—Steven L. Stephan
*Assistant Examiner*—Brian J. Biggi
*Attorney, Agent, or Firm*—Katherine A. Nelson

[57] ABSTRACT

A connector 20 for disk-shaped batteries 90 including a housing 22 with a battery receiving cavity 48, opposed end walls 30 having spring arms 32 that extend outwardly from the cavity 48 for retaining the battery 90 in the housing 22, and terminals 50 connector 20 is adapted for receiving a battery in a horizontal orientation. The lower and upper terminals 52, 54 are disposed in respective terminal receiving passageways 36, 42 of the housing 22 with spring arm contact sections 60 opposing each other along the housing side walls 24,28 and with surface mountable connecting sections 70 of both the terminals 52,54 extending outwardly from the housing base 34 at spaced locations for electrical connection to pads on a circuit board.

8 Claims, 6 Drawing Sheets

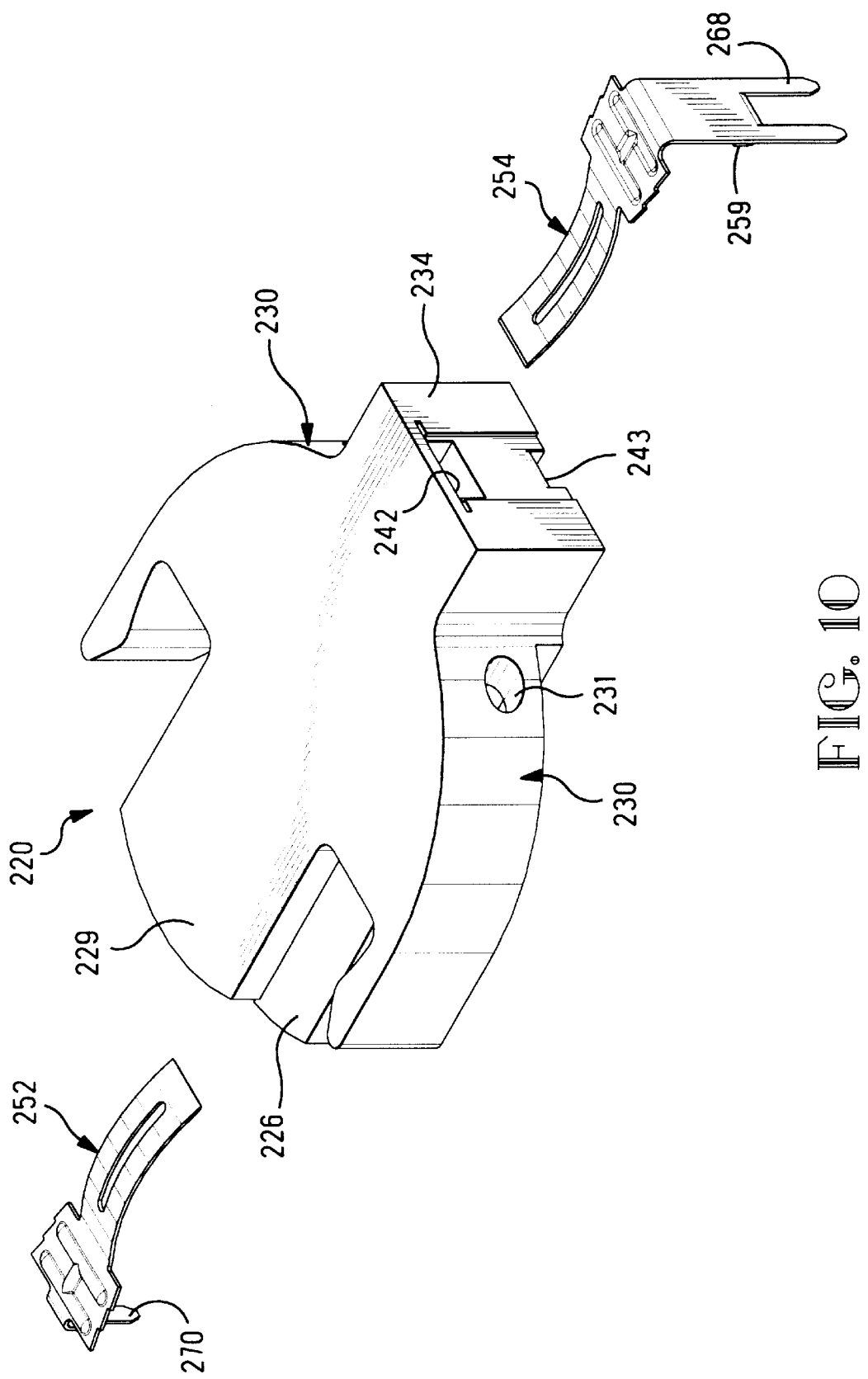

HORIZONTAL BATTERY CONNECTOR

FIELD OF THE INVENTION

This invention is related to connectors for batteries and more particularly to connectors for a disk-shaped cell or battery.

BACKGROUND OF THE INVENTION

Disk-shaped cells or batteries are often used as back up protection for electronic equipment should there be a failure in the conventional power system. Typically, these disk-shaped backup cells are relatively small, having, for example, a diameter of about 0.268 inches and a thickness of about 0.083 inches and are often referred to as "button batteries". The cell has a positive electrode extending along a major surface and the edge and a negative electrode extending over the other major surface and isolated from the positive electrode. For purposes of this invention, the term "battery" is to be understood to include a single cell. The battery is inserted into a connector housing mounted to a circuit board, the connector hereinafter being referred to as a "battery connector". It is desirable that a back up battery connector requires a minimum amount of space on a circuit board within the equipment, be easy to mount to the circuit board, be readily accessible for replacing a depleted battery, and be cost effective to manufacture. Furthermore, it is sometimes desirable to provide a back-up battery connector that is in a horizontal orientation with respect to a circuit board to which it is mounted.

In prior art horizontally oriented battery connectors, the battery is placed in an "open" pocket or housing, that is, the housing base has contacts that are on the bottom of the base and the battery is disposed above or between the contacts. Under certain conditions, such as during shipping of circuit boards or equipment having such batteries, the batteries may "pop out" of place thus rendering the back up capability inoperable. The addition of a separate cover alleviates the problem of inadvertent removal of the battery but this adds to the cost of manufacturing and assembling the equipment. It is desirable, therefore, to have a connector that permits horizontal orientation of the battery with respect to the circuit board, requires only a one piece housing and, furthermore, is cost effective to manufacture.

SUMMARY OF THE INVENTION

The present invention is directed to an electrical connector for a disk-shaped cell or battery. The electrical connector includes a dielectric housing having a battery receiving cavity, two terminal-receiving passageways extending through a back or base housing wall and into the cavity, and a positive terminal and a negative terminal disposed therein. The housing further includes opposed end walls having outwardly extending resilient arm portions dimensioned to receive the battery therebetween. In the preferred embodiment, the surface mountable positive and surface mountable negative terminals are substantially identical and are configured such that each has a spring arm contact section opposed from one another and electrically engageable with respective electrodes on opposite sides of the battery. The positive and negative terminals are insertable through the respective terminal-receiving passageways with spring arm contact sections opposing along the side walls of the housing. The surface mountable connecting sections of both of the terminals extend outwardly from the housing base at spaced locations along the same side of the base. The positive and negative terminals are electrically engageable with corresponding cell electrodes on opposite side surfaces of the cell. The surface mountable connecting sections of the positive and negative terminals are spaced apart a sufficient distance from each other to prevent bridging of solder therebetween when the surface mountable sections are soldered to respective circuit pads on a circuit board. It is to be understood that the sufficient distance will vary depending upon the design and size of the connector and the processing requirements for the particular connector design. In the preferred embodiment of the present invention, the positive and negative terminals are substantially identical and are inserted into a previously molded housing. The resulting connector is cost effective to make and the resilient arms of the housing have sufficient resiliency and retention force to allow multiple replacements of the cell in the connector.

Embodiments of the invention will now be described by way of example with reference to the accompanying drawings.

BRIEF DESCRIPTIONS OF THE DRAWINGS

FIG. 10 is an isometric view of the battery connector of FIG. 9 with the terminals exploded therefrom.

DETAILED DESCRIPTION OF THE DRAWINGS

Figure 6:
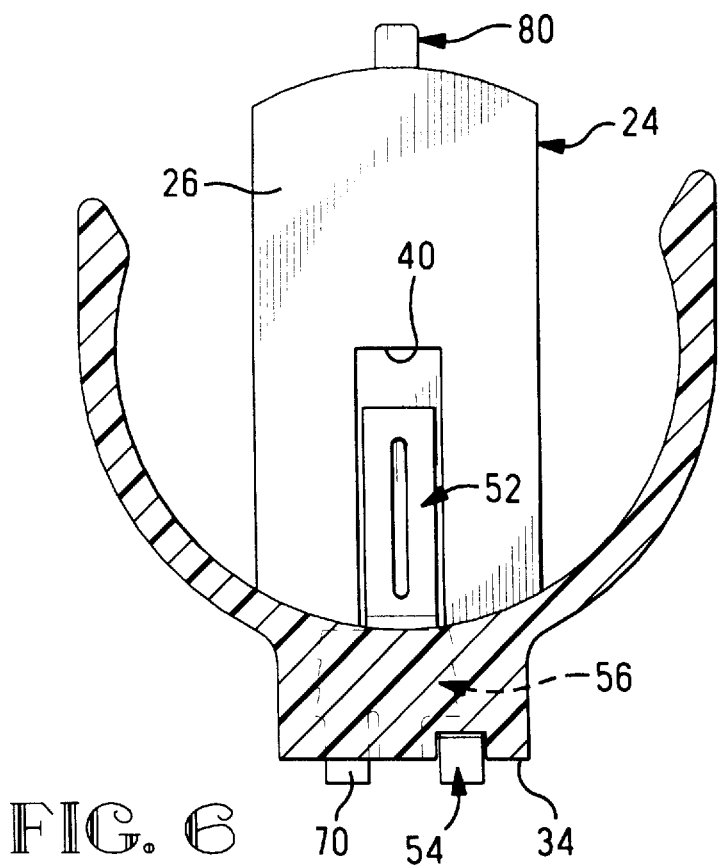
FIG. 6 is a sectional view of the connector of FIG. 2 and illustrating portions of the upper contact in phantom.
Figure 7:
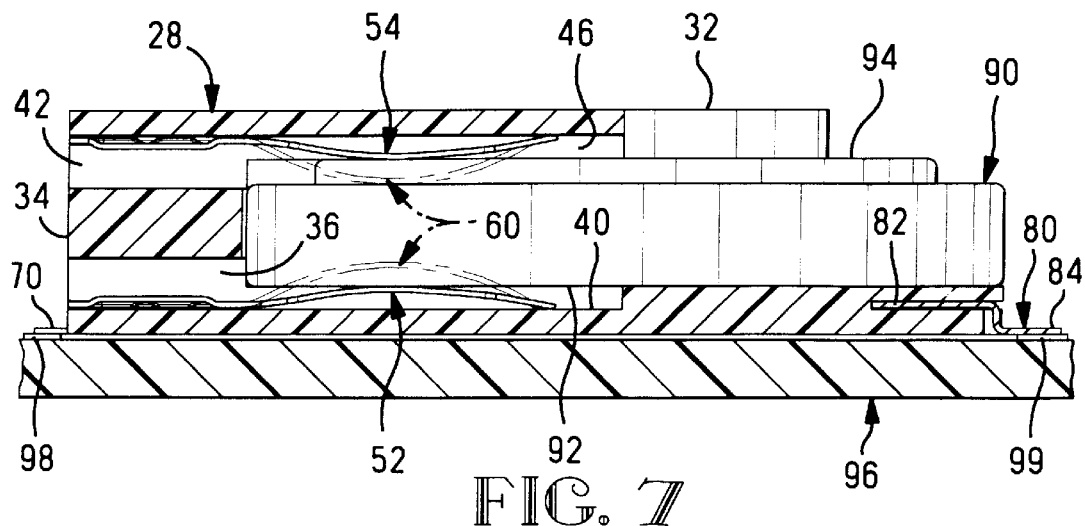
FIG. 7 is a cross-sectional view of the assembled connector of FIG. 2 mounted to a circuit board with the battery disposed in the cavity.

Referring now to FIGS. 1 through 7, the horizontally oriented battery connector 20 of the present invention includes a dielectric housing 22, having two terminals 50, including a lower terminal 52 and an upper terminal 54. For purposes of illustrating the invention, the lower terminal 52 is shown as the positive terminal and the upper terminal 54 is shown as the negative terminal as seen in FIG. 7. It is to be understood that the battery can be inserted in either direction, thus reversing the polarity of the terminals 52, 54 as shown.

The housing 22 includes a lower side wall 24, an opposed upper side wall 28, opposed end walls 30, and a base or back wall 34 together defining a battery receiving cavity 48 adapted to receive a disk-shaped battery 90. In the preferred orientation of housing 22, battery 90 is received horizontally into cavity 48. Lower side wall 24 includes extension 26 that is used to space the battery receiving cavity 48 of the connector 20 above the surface of a circuit board 96 to which the connector 20 is mounted, as shown in FIG. 7. In the first embodiment, the leading end 25 of wall 24 includes a slot 27 for receiving a retention clip 80, which is used to help hold connector 20 to the circuit board 96. Lower side wall 24 further includes a slot 40 for receiving a first contact portion 60 of a terminal 52 and side wall 28 includes a slot 46 for receiving first connecting portion 60 of terminal 54 as more fully explained below. The end walls 30 include forwardly extending resilient arm portions 32 adapted to securely hold a disk-shaped battery 90 therebetween. The base or bottom wall 34 includes a first or lower passageway 36 dimensioned to receive lower terminal 52 and an upper passageway 42 dimensioned to receive upper terminal 54. Passageways 36 and 42 are in communication with the respective slots 40, 46 in the lower and upper side walls 24, 28 respectively.

In a preferred embodiment the lower and upper terminals 52, 54 are substantially identical and are referred to generally as 50. Terminals 50 include a body 56 having a first connecting portion 60 extending outwardly from one edge thereof and defining a spring arm 62 having a slot 64 therein and a second connecting portion 66 extending from an opposite edge thereof and axially offset from the first connecting portion. Second connecting portion 66 includes terminal leg 68 having surface mountable contact portion 70 at the end thereof. Also shown in this embodiment is a retention clip 80 that is received at the leading end 25 of wall 24. Clip 80 includes a body 82 having retention barbs 83 along side edges thereof and an outwardly extending surface mountable portion 84 that is adapted to be soldered to an electrically isolated pad 99 on circuit board 96, as shown in FIG. 7.

Figure 1:
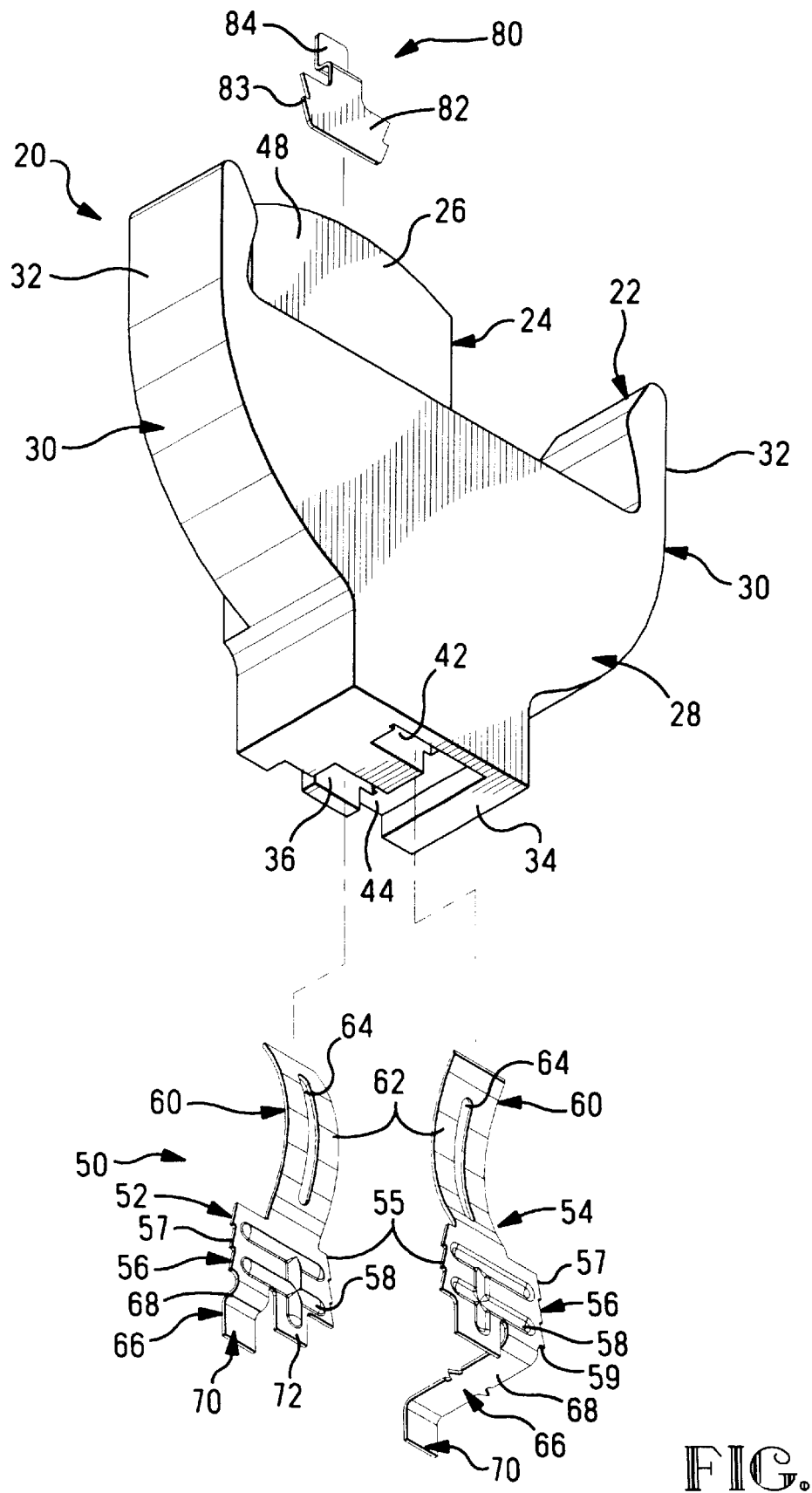
FIG. 1 is an isometric view of a battery connector of the present invention with the terminals exploded therefrom.
Figure 2:
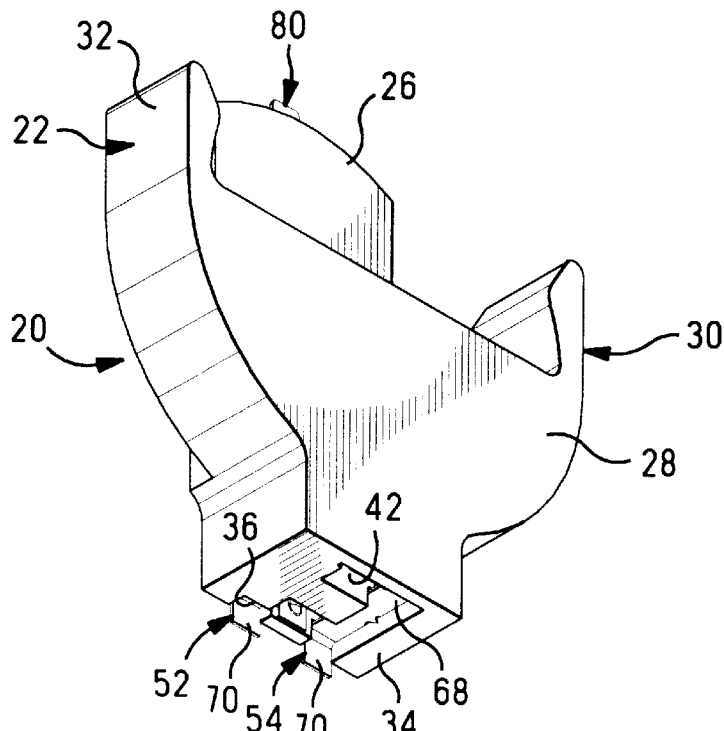
FIG. 2 is an isometric view of the assembled battery connector of FIG. 1.
Figure 3:
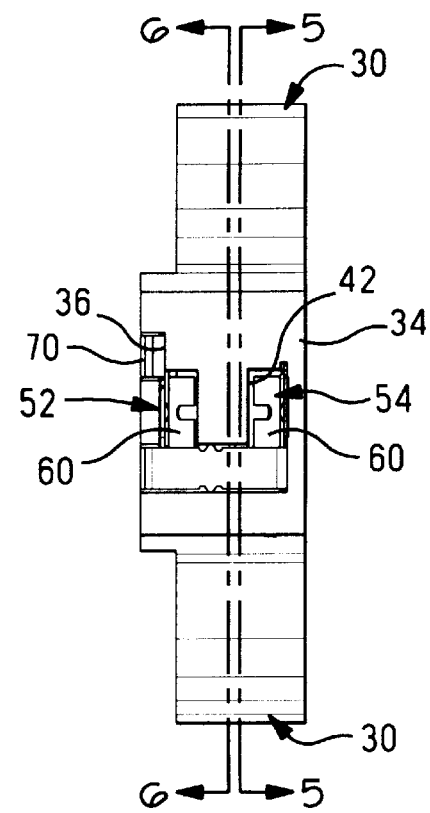
FIG. 3 is a flat plan view of the back wall of the assembled connector of FIG. 2.
Figure 4:
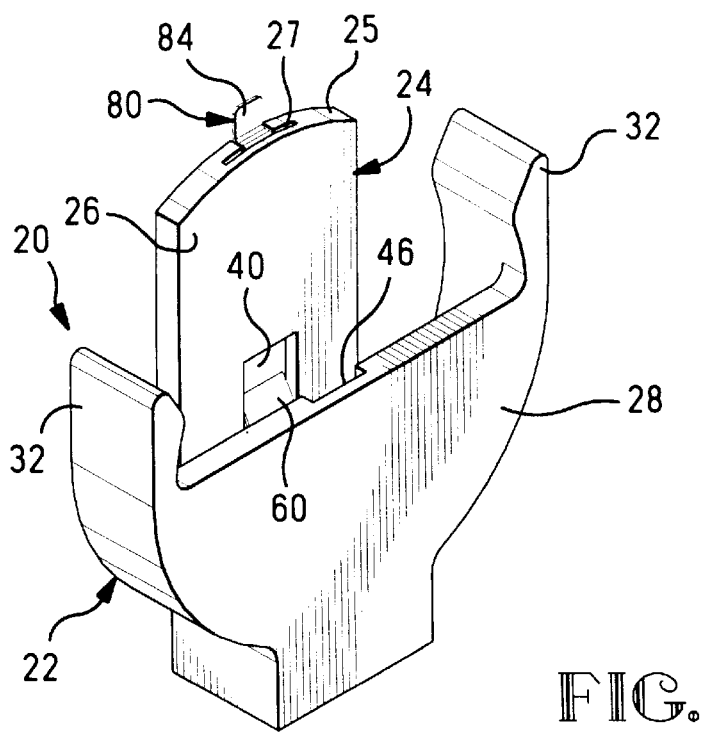
FIG. 4 is an isometric view of the assembled connector.
Figure 5:
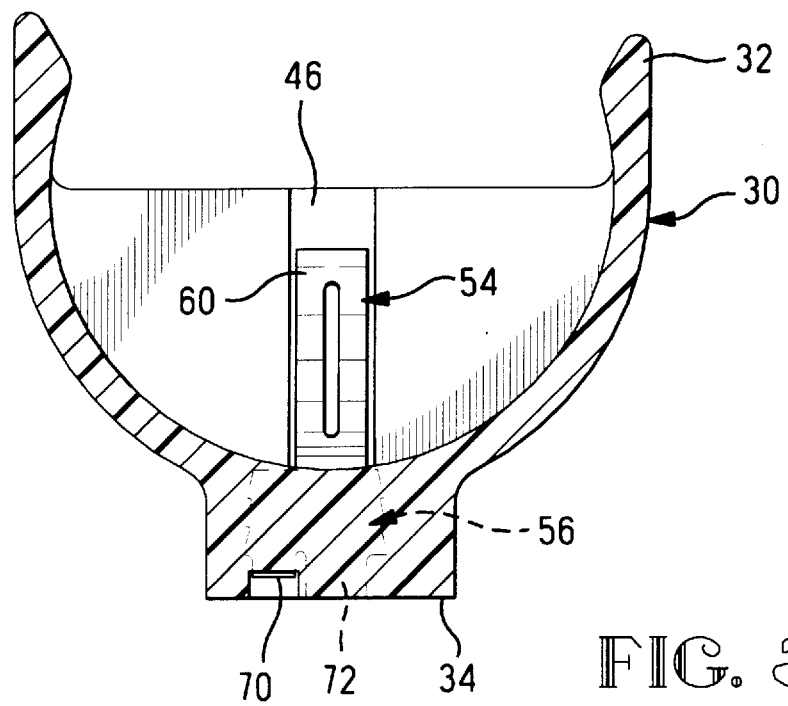
FIG. 5 is a sectional view of the connector of FIG. 2 with portions of the lower contact illustrated in phantom.

As can best be seen in FIG. 1, the body 56 of the terminals 50 include a plurality of reinforcing ribs 58 and retention barbs 59 extending outwardly therefrom along side edges for securing the terminal body 56 in the connector housing passageways. As can also be seen in this Figure, the body portion 56 is wider than the first and second connecting portions 60, 66 such that the first connecting portion 60 is proximate one side edge 55 of the body 56 and the second connecting portion 70 proximate the second edge 57 of the body 56. The first and second connecting portions 60, 70 thus are staggered axially with respect to each other. The body 56 further includes a stabilization tab 72 extending outwardly from the same body edge as the second connecting portion 70 and substantially in axial alignment with the first connecting portion 60. The stabilization tab 72 is used as a push surface to help insert the respective terminals 52, 54 into the respective housing passageways 36, 42 and to stabilize the terminals 52, 54 therein.

In assembling connector 20, the first connecting portion 60 of lower terminal 52 is inserted into the passageway 36 in housing 22 with body portion 56 disposed in corresponding passageway 36 and the spring arm 62 of first connecting portion 60 is disposed in slot 40 of lower side wall 24, as can be seen in FIGS. 6 and 7. After inserting the lower terminal 52, the upper terminal 54 is inserted into corresponding passageway 42 with the first connecting section 60 being received in the slot 46 in upper side wall 28 and body 56 disposed in passageway 42. As can best be seen in FIG. 2, the base 34 includes a recess 44 for receiving the longer terminal leg 68 of the upper terminal 54. When both terminals 52, 54 are positioned in their respective side walls 24, 28, the spring arms of first connecting portions 62 are opposed to each other along the respective side walls 24, 28 and in position for electrical connection to the respective terminals of the battery 90, as seen in FIG. 7. The surface mountable contact sections 70 of the respective terminals 52, 54 extend outwardly from the base 34 of the housing 22 proximate lower wall 24 and are spaced apart for surface mounting to contact pads 98 on the circuit board 96, as shown on FIG. 7. The spring arms 62 extend into the battery receiving cavity 48 and resile outwardly from a first position indicated by the broken lines upon insertion of the battery 90 therebetween as shown in FIG. 7. FIG. 7 further shows the retention clip 80 positioned at the leading end of wall 24 and having the surface mount portion 84 secured to an isolated conductive area 99 on the surface of circuit board 96.

Upon insertion of a battery 90 into the battery receiving cavity 48, the resilient arm portions 32 of end walls 30 grip the edge of the battery 90 to hold it in the connector housing 22 and the spring arms 62 of first connecting portions 62 engage the respective positive and negative electrodes 92, 94.

Figure 8:
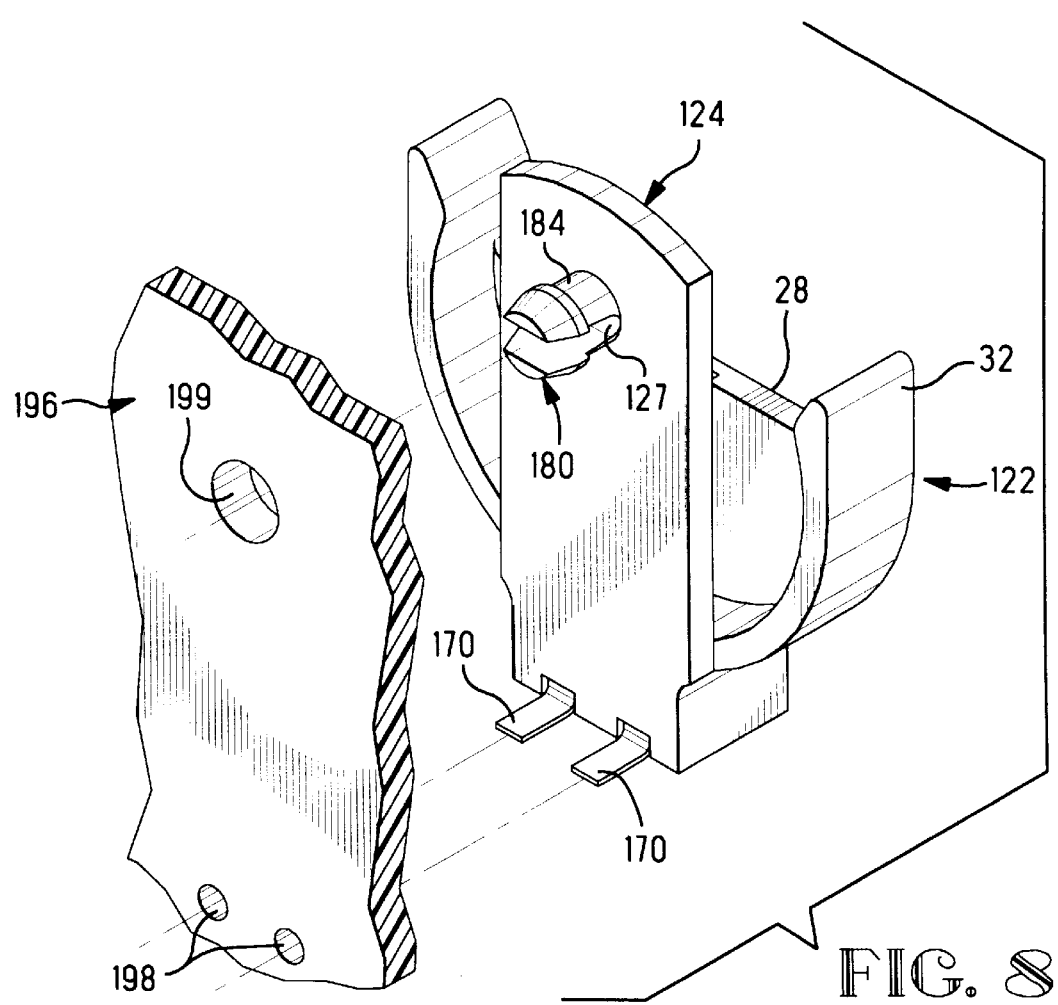
FIG. 8 is a perspective view of an alternative embodiment of the present invention exploded from a circuit board.

FIG. 8 shows an alternative embodiment of the present invention in which the upper and lower terminals 152 include second connecting portions having solder tails 170, which are adapted to be received in respective through-holes 198 of a circuit board 196. Additionally, FIG. 8 shows the use of a board lock 180 received in an aperture 127 of connector housing wall 124 and having a leading portion 184 adapted to be received in a corresponding through-hole 199 of circuit board 196. The embodiment 120 in FIG. 8 is substantially identical to embodiment 20 shown in FIGS. 1 through 7 with the exception that the terminals 170 include solder tails and are not surface mounted to the board.

Figure 9:
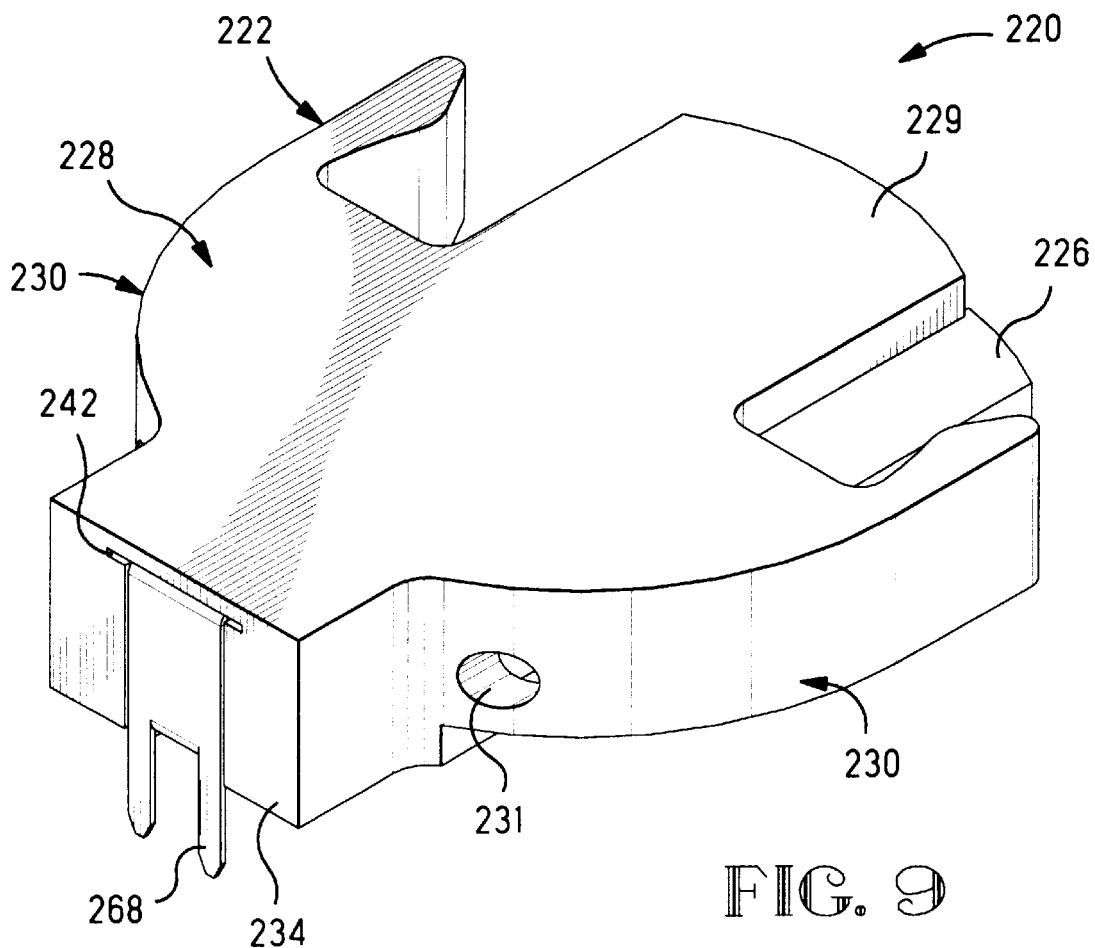
FIG. 9 is an isometric view of a further embodiment of the assembled battery connector.
Figure 11:
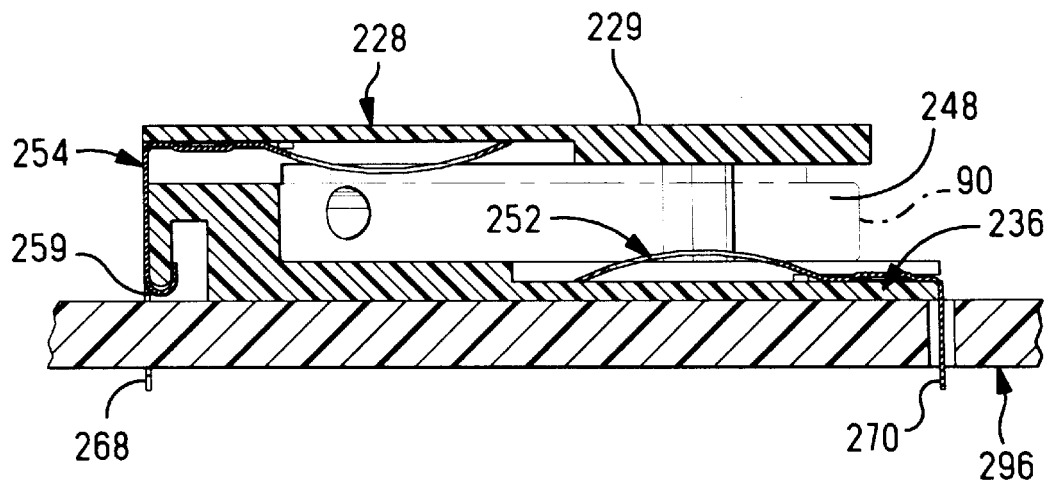
FIG. 11 is a sectional view of the connector of FIG. 9 with portions of the battery illustrated in phantom.

FIGS. 9 through 11 illustrate a further embodiment 220 of the horizontal battery connector. The housing 222 includes a lower side wall 224, an opposed upper side wall 228, opposed end walls 230, and a base 234 together defining a battery receiving cavity 248 adapted to receive a disk-shaped battery 90. In this embodiment both the lower side wall 224 and the upper side wall 228 include an extension 226, 229, respectively. In this embodiment, end walls 230 include apertures 231 extending into cavity 248 for inserting a tool used to remove a battery from cavity 248. Base 234 includes terminal receiving passageway 242 for receiving upper terminal 254 and a retention slot 243 for receiving a cooperating retention tab 259 of terminal 254. Extension 226 includes terminal receiving passageway 236 for receiving lower terminal 252. Terminal 252 includes a solder tail 270 for termination in a through-hole of circuit board 296, as seen in FIG. 11. Terminal 254 includes a retention tab 259, as best seen in FIG. 11 that helps to stabilize and retain terminal 254 in connector housing 222.

The terminals 50 are substantially identical and can be stamped from a continuous metal strip and handled while attached to a carrier strip, thus facilitating subsequent plating and automatic assembly operations. Suitable materials for the terminals of the present invention include copper alloys such as phosphor bronze and the like.

The housing 22 of the present invention is molded from a high temperature thermoplastic suitable for withstanding temperatures associated with soldering surface mounted connectors, as known in the art. The housings are molded in conventional molds. Although the embodiments are shown for batteries oriented horizontally with respect to the circuit board, it is to be recognized that the connector may also be mounted in an upright position such that the battery is in a vertical orientation with respect to the board.

The present invention provides a battery connector for disk-shaped batteries that may be mounted to a board in a horizontal orientation, be easily soldered to a circuit board while preventing bridging between the respective circuit mount contact sections, and is cost effective to manufacture. The connector of the present invention, furthermore, provides a back up battery that requires a minimum amount of space between parallel circuit boards.

It is thought the battery connector of the present invention and many of its attendant advantages will be understood from the foregoing description. It is apparent that various changes may be made in the form, construction, and arrangement of parts thereof without departing from the spirit or scope of the invention, or sacrificing all of its material advantages.

I claim:

1. A battery connector for disk-shaped batteries includes a dielectric housing having a battery receiving face at an open end of a battery receiving cavity; said housing including a back wall having two terminal receiving passageways extending into said cavity, one proximate each side wall thereof; and spring arms at free ends of end walls dimensioned to receive said battery therebetween and retain said battery in said cavity; positive and negative terminals disposed in respective said terminal receiving passageways including spring arm contact sections engagable with respective electrodes of said battery and board connecting sections exposed at a board mounting face of said housing, said connector being characterized in that:

said board mounting face is orthogonal to said battery receiving face;

said board connecting sections of both said terminals extend outwardly from said back wall proximate respective side walls, said board connecting sections being bent at right angles and both being directed toward said board mounting face of said housing, said connecting sections being axially offset from each other, and coextend beyond said board mounting face;

whereby said positive and said negative terminals are electrically engagable with battery electrodes on opposed surfaces of said battery, and board connecting sections of said positive and negative terminals are spaced apart at least a sufficient distance from each other to prevent bridging therebetween when said connecting sections are soldered to respective circuits of a circuit board.

2. The battery connector of claim 1 wherein said surface mountable connecting sections of said positive and negative terminals are spaced apart at least the thickness of said battery.

3. The battery connector of claim 1 wherein said back wall is orthogonal to said board-mounting face.

4. The battery connector of claim 3 wherein said board connecting sections of both said terminals are surface mountable and include stabilizing tabs to be engaged by tool assisted pushing of the terminals into the housing and to stabilize the terminals therein.

5. The battery connector of claim 1 wherein said board mounting face of said housing includes an extension coextending along and beyond said open end of said battery receiving cavity, said extension being adapted to receive a retention clip for assisting in securing said housing to said board.

6. The battery connector of claim 5 wherein said retention clip is surface mountable.

7. The battery connector of claim 5 wherein said retention clip includes a board lock portion adapted to be received in an aperture of said board.

8. The battery of claim 1 wherein said connecting sections of said terminals are solder tails.

* * * * *